(12) United States Patent
Jung

(10) Patent No.: US 10,803,874 B2
(45) Date of Patent: Oct. 13, 2020

(54) ELECTRONIC DEVICE, CONTROL METHOD THEREOF, AND COMPUTER READABLE RECORDING MEDIUM

(71) Applicant: SAMSUNG ELECTRONICS CO., LTD., Suwon-si (KR)

(72) Inventor: Chisang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/236,900

(22) Filed: Dec. 31, 2018

(65) Prior Publication Data

US 2019/0206409 A1   Jul. 4, 2019

(30) Foreign Application Priority Data

Jan. 3, 2018 (KR) ........................ 10-2018-0000580

(51) Int. Cl.
| | | |
|---|---|---|
| G06F 21/00 | (2013.01) | |
| G06F 21/32 | (2013.01) | |
| G10L 17/06 | (2013.01) | |
| G06K 9/00 | (2006.01) | |
| G10L 17/22 | (2013.01) | |
| G10L 25/84 | (2013.01) | |
| G10L 17/00 | (2013.01) | |
| H04L 9/32 | (2006.01) | |

(52) U.S. Cl.
CPC .............. *G10L 17/06* (2013.01); *G06F 21/32* (2013.01); *G06K 9/00087* (2013.01); *G10L 17/005* (2013.01); *G10L 17/22* (2013.01); *G10L 25/84* (2013.01); *H04L 9/3231* (2013.01)

(58) Field of Classification Search
CPC ................................ G10L 17/00; G06F 21/32
See application file for complete search history.

(56) References Cited

U.S. PATENT DOCUMENTS

| | | | | |
|---|---|---|---|---|
| 2010/0071031 | A1* | 3/2010 | Carter ..................... | G06F 21/32 726/2 |
| 2012/0313753 | A1* | 12/2012 | Miller ................ | G06K 9/00892 340/5.82 |
| 2015/0205623 | A1 | 7/2015 | DiVincent et al. | |
| 2016/0112415 | A1 | 4/2016 | Park et al. | |

(Continued)

FOREIGN PATENT DOCUMENTS

| | | |
|---|---|---|
| CN | 105404809 A | 3/2016 |
| CN | 104573462 B | 5/2017 |

(Continued)

OTHER PUBLICATIONS

International Search Report (PCT/ISA/210) dated Apr. 9, 2019 issued by the International Searching Authority in International Application No. PCT/KR2018/016781.

(Continued)

*Primary Examiner* — Shreyans A Patel

(74) *Attorney, Agent, or Firm* — Sughrue Mion, PLLC

(57) ABSTRACT

An electronic device includes a communication interface that receives voice data and fingerprint data; and a processor that determines an access right to the electronic device based on at least one of a voice score obtained by comparing the received voice data with stored voice data and a fingerprint score obtained by comparing the received fingerprint data with stored fingerprint data.

19 Claims, 13 Drawing Sheets

(56) References Cited

U.S. PATENT DOCUMENTS

2017/0147803 A1    5/2017  Zizi et al.
2018/0204576 A1*  7/2018  Dhoot .................. G10L 17/005

FOREIGN PATENT DOCUMENTS

| EP | 3367277 A1 | 8/2018 |
|----|---|---|
| GB | 2229305 A | 9/1990 |
| JP | 2004-32479 A | 1/2004 |
| KR | 10-2004-0052661 A | 6/2004 |
| KR | 10-0944248 B1 | 2/2010 |
| KR | 10-2010-0027865 A | 3/2010 |
| KR | 10-2016-0109058 A | 9/2016 |
| KR | 10-2017-0068305 A | 6/2017 |

OTHER PUBLICATIONS

Written Opinion (PCT/ISA/237) dated Apr. 9, 2019 issued by the International Searching Authority in International Application No. PCT/KR2018/016781.
Communication dated May 8, 2019, issued by the European Patent Office in counterpart European Application No. 19150124.6.

\* cited by examiner

FIG. 1
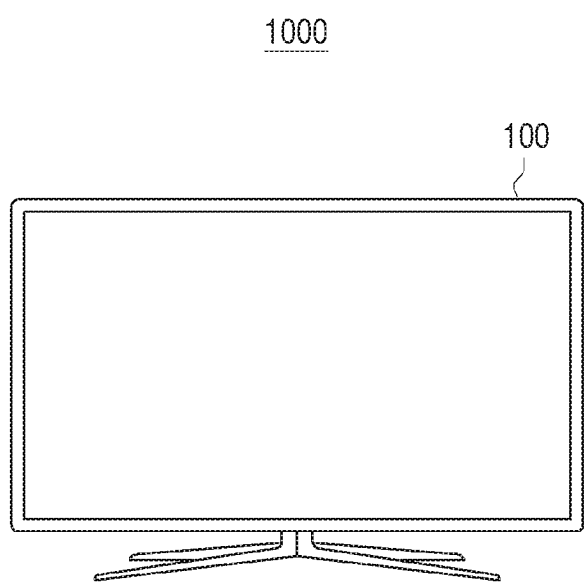
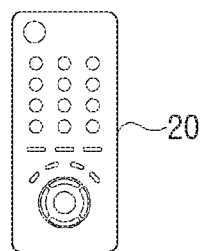

FIG. 7A
FIG. 7B
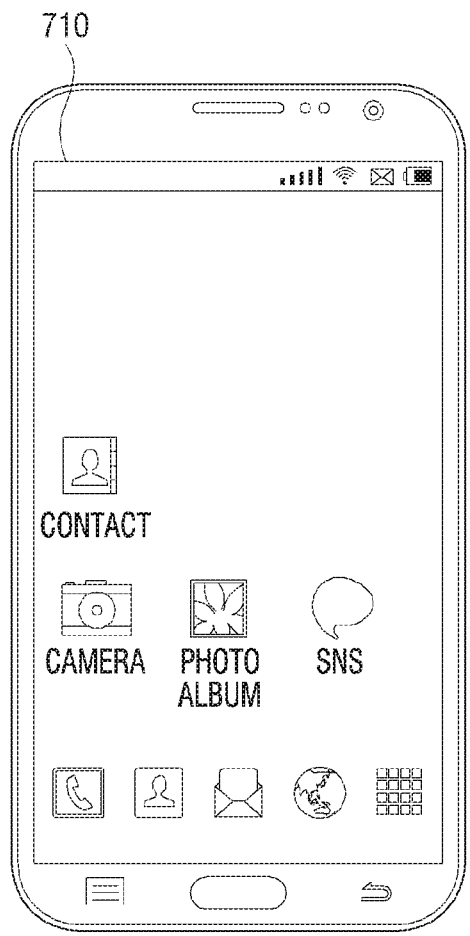
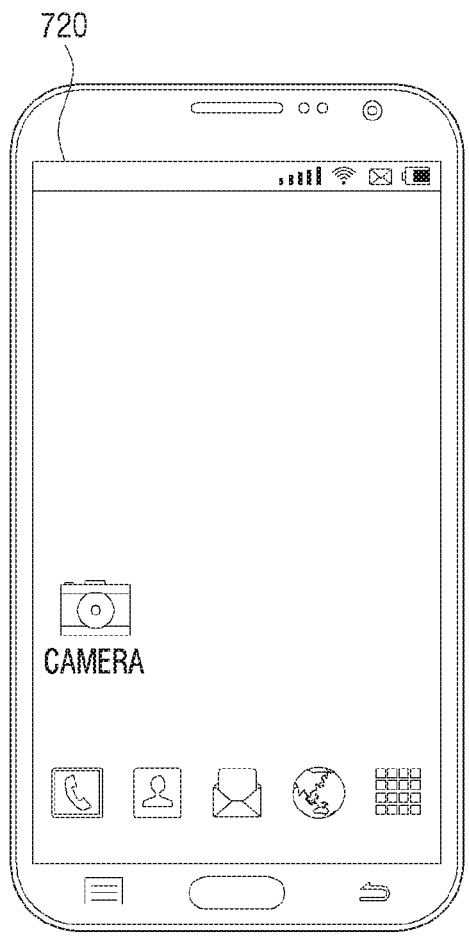

ELECTRONIC DEVICE, CONTROL METHOD THEREOF, AND COMPUTER READABLE RECORDING MEDIUM

CROSS-REFERENCE TO RELATED APPLICATION(S)

This application is based on and claims priority under 35 U.S.C. § 119 to Korean Patent Application No. 10-2018-0000580, filed on Jan. 3, 2018, in the Korean Intellectual Property Office, the disclosure of which is incorporated herein by reference in its entirety.

BACKGROUND

Field

The disclosure relates to an electronic device, a control method thereof, and a computer readable recording medium, and more particularly, to an electronic device, a control method thereof, and a computer readable recording medium that may improve security by performing differential access rights using voice data and fingerprint data.

Description of Related Art

In accordance with the development of electronic technology, various types of electronic products have been developed and spread. Particularly, various kinds of electronic devices such as a television (TV), a mobile phone, a personal computer (PC), a notebook PC, a personal digital assistants (PDA), a set-top box, and the like, are used in public places as well as in most ordinary households.

In order to use a personalized service in a device that is publicly used by a plurality of users such as a TV, there was an inconvenience that every time a user is changed, a new login is required to change an account.

In order to solve such an inconvenience, a technique has been developed to log in to a user account using a voice print included in a user's voice even without logging in via identification (ID) and password.

However, when utterance is short, surrounding noise is severe, or voices are similar between family members, there is a problem that a recognition accuracy of a speaker is impaired.

Accordingly, there is a need for techniques for more accurately identifying a user despite a surrounding environment.

SUMMARY

Provided are an electronic device, a control method thereof, and a computer readable recording medium that may improve security by performing differential access rights using voice data and fingerprint data.

In accordance with an aspect of the disclosure, an electronic device includes: a communication interface configured to receive voice data and fingerprint data; and a processor configured to determine an access right to the electronic device based on at least one of a voice score obtained by comparing the received voice data with stored voice data and a fingerprint score obtained by comparing the received fingerprint data with stored fingerprint data.

The electronic device may further include a memory configured to store voice data and fingerprint data for a plurality of users, wherein the processor may be further configured to: compare the received voice data with the stored voice data and identify a user, among the plurality of users, having a highest voice score; and compare the received fingerprint data with the stored fingerprint data and identify a user, among the plurality of users, having a highest fingerprint score.

The processor may be further configured to identify the user having the highest voice score depending on whether the voice score of the user for the received voice data is greater than or equal to a predetermined threshold value, and identify the user having the highest fingerprint score depending on whether the fingerprint score of the user for the received fingerprint data is greater than or equal to a predetermined threshold value.

The processor may be further configured to determine that a user has a first access right when the user having the highest voice score and the user having the highest fingerprint score are matched to each other, and determine that a user has a second access right, which may be lower than the first access right, when the user having the highest voice score and the user having the highest fingerprint score are not matched to each other.

The processor may be further configured to, when the user having the highest voice score and the user having the highest fingerprint score are different from each other, identify a user having higher recognition accuracy among the user having the highest voice score and the user having the highest fingerprint score.

The processor may be further configured to obtain a signal to noise ratio (SNR) based on the received voice data, and correct the voice score of the user by using the obtained signal to noise ratio.

The processor may be further configured to obtain a control command by recognizing the received voice data, and determine whether the obtained control command is performed based on the obtained control command and the determined access right.

The processor may be further configured to provide a user interface (UI) screen for additional authentication when the obtained control command is not performed by the determined access right, and change the determined access right when the additional authentication is performed through the provided UI screen.

The processor may be further configured to control the communication interface to transmit information about the determined access right to an external device, when the obtained control command is performed by the determined access right.

In accordance with an aspect of the disclosure, a control method of an electronic device includes obtaining voice data and fingerprint data; obtaining a voice score by comparing the obtained voice data with stored voice data and obtaining a fingerprint score by comparing the obtained fingerprint data with stored fingerprint data; and determining an access right to the electronic device based on at least one of the voice score and the fingerprint score.

The method may include identifying a user, from among a plurality of users, having a highest voice score by comparing the obtained voice data with stored voice data for the plurality of users, and identifying a user having a highest fingerprint score by comparing the obtained fingerprint data with stored fingerprint data for the plurality of users.

The user having the highest voice score may be identified depending on whether the voice score of the user is greater than or equal to a predetermined threshold value, and the user having the highest fingerprint score may be identified depending on whether the fingerprint score is greater than or equal to a predetermined threshold value.

In the determining of the access right, it may be determined that a user has a first access right when the user having the highest voice score and the user having the highest fingerprint score are matched to each other, and it may be determined that a user has a second access right, which may be lower than the first access right, when the user having the highest voice score and the user having the highest fingerprint score are not matched to each other.

When the user having the highest voice score and the user having the highest fingerprint score are different from each other, a user having higher recognition accuracy among the user having the highest voice score and the user having the highest fingerprint score may be identified.

A signal to noise ratio (SNR) may be obtained based on the obtained voice data, and the voice score of the user may be corrected by using the obtained signal to noise ratio.

The method may further include obtaining a control command by recognizing the obtained voice data; and determining whether the obtained control command is performed based on the obtained control command and the determined access right.

The method may further include providing a user interface (UI) screen for additional authentication when the obtained control command is not performed by the determined access right; and changing the determined access right when the additional authentication is performed through the provided UI screen.

The method may further include transmitting information about the determined access right to an external device, when the obtained control command is performed by the determined access right.

In accordance with an aspect of the disclosure, a non-transitory computer readable recording medium including a program for executing a control method of an electronic device includes obtaining voice data and fingerprint data; obtaining a voice score by comparing the obtained voice data with stored voice data and obtaining a fingerprint score by comparing the obtained fingerprint data with stored fingerprint data; and determining an access right to the electronic device based on at least one of the voice score and the fingerprint score.

In accordance with an aspect of the disclosure, an electronic device includes a display; a processor configured to: control the display to display a message for performing user authentication; receive fingerprint data and voice data from an external device; compare the received fingerprint data to stored fingerprint data and compare the received voice data to stored voice data; based on the comparing of the received fingerprint data to stored fingerprint data, determine a voice score, and based on the comparing the received voice data to stored voice data, determine a fingerprint score; and based on the determined voice score and the determined fingerprint score, determine an access right for a user of the external device, and provide content on the display based on the determined access right.

The access right may be one from among a first access right, a second access right, and a third access right, and wherein the second access right may be lower than the first access right, and the third access right may be lower than the second access right.

The processor may be further configured to determine that the access right is the first access right based on the voice score being greater than or equal to a predetermined voice score threshold value and the fingerprint score being greater than or equal to a predetermined fingerprint score threshold value.

The processor may be further configured to determine that the access right is the second access right based on the voice score being greater than or equal to a predetermined voice score threshold value and the fingerprint score being less than a predetermined voice score threshold value.

The processor may be further configured to determine that the access right is the third access right based on the voice score being less than a predetermined voice score threshold value and the fingerprint score being less than a predetermined voice score threshold value.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a view illustrating an electronic device controlling system according to an embodiment;

FIGS. 6A, 6B, 6C, 7A, 7B, and 8 are views illustrating various examples of a UI screen according to access right of the electronic device according to an embodiment;

DETAILED DESCRIPTION

Figure 2:
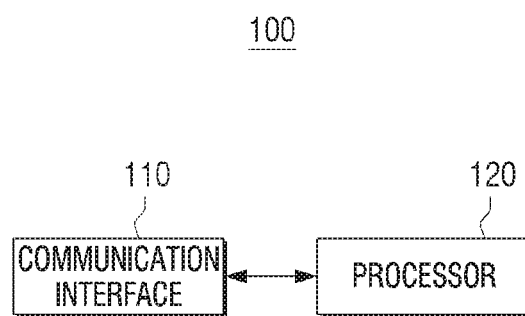
FIG. 2 is a block diagram illustrating a simplified configuration of the electronic device according to an embodiment.

Embodiments of the disclosure are described in detail with reference to the accompanying drawings. However, it may be understood that the disclosure is not limited to the embodiments described hereinafter, but includes various modifications, equivalents, and/or alternatives of the embodiments of the disclosure. In relation to explanation of the drawings, similar drawing reference numerals may be used for similar constituent elements.

General terms that are currently widely used were selected as terms used in embodiments in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by these terms. The terms are used only to distinguish one component from another component.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, embodiments will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the present specification.

Hereinafter, embodiments will be described in more detail with reference to the drawings.

FIG. 1 is a view illustrating an electronic device controlling system of an electronic device according to an embodiment.

Referring to FIG. 1, an electronic device controlling system 1000 includes an electronic device 100 and a remote controller 20.

The electronic device 100 may process contents. Specifically, the electronic device 100 may process contents input from external input sources or pre-stored contents. Here, the electronic device 100 may be various devices including a display, such as a television (TV), a cellular phone, a smartphone, a personal digital assistant (PDA), a notebook PC, a monitor, a tablet PC, an e-book, an electronic frame, a kiosk, and the like. In this case, the electronic device 100 may display the processed contents. The electronic device 100 may be various devices that do not include the display, such as a server, a set-top box, and the like. In this case, the electronic device 100 may transmit the processed contents to an external device.

In addition, the electronic device 100 receives manipulation commands. Specifically, the electronic device 100 receives a variety of control commands from the remote controller 20. The present embodiment describes that the manipulation commands are received from the remote controller 20, but in an implementation, the manipulation commands may also be received through an input means such as buttons or a touch screen included in the electronic device 100. Alternatively, a voice command may also be received from a microphone included in the electronic device 100 and an external microphone connected to the electronic device.

In addition, the electronic device 100 receives data of a user. Specifically, the electronic device 100 may receive fingerprint data and voice data of the user from the remote controller 20, the microphone included therein, or the external microphone.

Specifically, when the electronic device 100 includes the microphone, the electronic device 100 may receive an analog voice signal through the microphone included therein, digitalize the received analog voice signal, and process the digitalized voice data.

When the electronic device 100 receives the voice data from the remote controller 20 and the external microphone, the remote controller 20 or the external microphone may digitalize the received analog voice signal and transmit the digitalized voice data to the electronic device 100. In this case, the electronic device 100 may receive the voice data from the remote controller 20 or the external microphone through data communication methods such as Wi-Fi, Bluetooth, and the like.

In addition, the electronic device 100 may identify the users by each using the received data of the user, and may differentially allocate an access right to the electronic device 100 depending on an identification result. In addition, the electronic device 100 may perform a function or provide the contents based on the allocated access right.

It is hereinabove described that one electronic device performs all operations described above, but in an actual implementation, a plurality of electronic devices may separately perform some of the operations. For example, some of the plurality of operations described above may be performed by any one or any combination of the server, the set-top box, and the remote controller and the remaining operations may be performed by the display device.

The remote controller 20 receives a manipulation command for the electronic device 100 from the user. In this case, the remote controller 20 may be a dedicated device that performs only a manipulation of the electronic device 100, and the remote controller 20 may transmit the manipulation command received from the user to the electronic device 100.

The remote controller 20 may receive data on the user. Specifically, the remote controller 20 may receive voice data or fingerprint data of the user. In addition, the remote controller 20 may transmit the received data of the user to the electronic device 100. In this case, the remote controller 20 may perform a user identification operation for each of the received data of the user and then transmit an identification result to the electronic device 100. Specifically, the remote controller 20 may transmit voice data that a voice signal received in the form of an analog signal is converted into a digital signal to the electronic device 100.

In this case, the remote controller 20 may transmit the manipulation command in a unidirectional or bidirectional wireless communication method. Specifically, the remote controller 20 may include a plurality of keys such as direction keys or number keys, and may transmit a control command corresponding to a key selected by the user to the electronic device 100. Such a control command may include a channel up/down for channel selection, a sound up/down, a channel number, a character key, a movement command of cursor (e.g., direction key), an execution command of selected item, and the like.

In addition, the remote controller 20 may include a key for receiving the voice data or the fingerprint data of the user. In this case, the key for receiving the fingerprint data of the user and the key for receiving the voice data of the user may be the same key as each other.

FIG. 1 illustrates that the remote controller 20 is illustrated in the form of including the button keys and the direction keys, but in an actual implementation, a smartphone and the like may also be used.

It is hereinabove illustrated and described that the electronic device 100 is directly connected to the remote controller 20, but in an implementation, the electronic device 100 and the remote controller 20 may be connected to each other through a relay device such as a router or the like. In addition, in the illustrated diagram, it is illustrated that the electronic device 100 is connected to one remote controller 20, but the electronic device 100 may be connected to a plurality of remote controllers, and conversely, the remote controller 20 may also be connected to a plurality of display devices.

In addition, it is hereinabove described that the electronic device 100 receives the manipulation command through the remote controller 20, but in an implementation, the electronic device 100 may receive the manipulation command and the data of the user through the touch screen, the button, the microphone, or the like provided on its own.

In this case, the electronic device 100 may identify the user based on the received data and may also transmit information on the access right determined for the identified user to an external device including a display.

FIG. 2 is a block diagram illustrating a simplified configuration of the electronic device according to an embodiment.

Referring to FIG. 2, the electronic device 100 includes a communication interface 110 and a processor 120.

The communication interface 110 is a component that performs communication with various kinds of external devices according to communication methods. The communicator 110 may be connected to the external device through a local area network (LAN) or an Internet network, and may be connected to the external device in a wireless communication method (e.g., Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, WiBRO, or the like).

The communication interface 110 may include a plurality of communication modules for performing communication with the external device by using a plurality of communication methods. For example, the communication interface 110 may perform the communication with the remote controller by using infrared rays, and may perform the communication with the server by using Wi-Fi. The communication interface 110 may also communicate with the remote controller and the server by using only Wi-Fi.

The communication interface 110 may receive the voice data and the fingerprint data. Specifically, the communication interface 110 may receive the voice data and the fingerprint data from the external device or the remote controller. Here, the voice data may include a voice print of the user.

The communication interface 110 may transmit the information on the access right determined by the processor 120 to the external device.

When the user identification operation is performed by the external device, the communication interface 110 may receive information on the user identified using the voice data or the user identified using the fingerprint data.

It is hereinabove described that the data is received from the external device through the communication interface 110, but in an actual implementation, the electronic device 100 may obtain the voice data or the fingerprint data from the button, the microphone, or the like included in the electronic device 100.

The processor 120 may control an overall operation and function of the electronic device 100. Specifically, the processor 120 may differentially determine the access right of the user to the electronic device 100 by using the obtained voice data or fingerprint data.

The processor 120 may identify the user by using the obtained voice data and may identify the user by using the obtained fingerprint data. Here, identifying the user means that a probability that the user determined by analyzing the data matches an actual user is a predetermined value or more.

In addition, the processor 120 may determine the access right to the electronic device 100 based on a user identification result using the voice data and a user identification result using the fingerprint data. Here, the access right may mean a right for the user to access, read, write, and execute programs, processes, data, directories, files, etc. of the electronic device 100. In addition, differentially determining the access right means that an accessible or executable range varies depending on a level of the access right. An example of an operation according to the access right will hereinafter be described in detail with reference to FIGS. 6A to 8.

For example, in a case in which the user identified with the voice data and the user identified with the fingerprint data are the same as each other, the electronic device 100 may determine the access right of the identified user as a first access right, which is the highest right. In a case in which the user is identified by only one of the voice data and the fingerprint data, the electronic device 100 may determine the access right of the identified user as a second access right which is lower than the first access right. In a case in which the user is not identified by either the voice data or the fingerprint data, the electronic device 100 may determine the access right of the user as the lowest third access right.

In addition, the processor 120 may voice-recognize the obtained voice data to generate a control command. In addition, the processor 120 may determine whether or not the generated control command may be executed, based on the generated control command and the determined access right.

In this case, in a case in which the execution of the generated control command is impossible using the determined access right, the processor 120 may perform an operation for changing the access right. Specifically, the processor 120 may display a UI screen for additional authentication, and may change the determined access right when the additional authentication is performed through the UI screen.

In a case in which the execution of the generated control command is possible using the determined access right, the processor 120 may perform an operation corresponding to the generated control command. I a case in which the control command is a control command for the external device, the processor 120 may control the communication interface 110 to transmit the generated control command to the external device.

It is hereinabove described to be limited to a case in which the obtained voice data is recognized to generate the control command, but in an actual implementation, a control command corresponding to voice or a button manipulation which is input after the access right is determined may be generated, and whether or not the generated control command may be executed may be determined.

As described above, it is possible to expect an effect of improving an accuracy of user identification and enhancing security by differentially allocating the access right to the users identified by using both the voice data and the fingerprint data.

Figure 3:
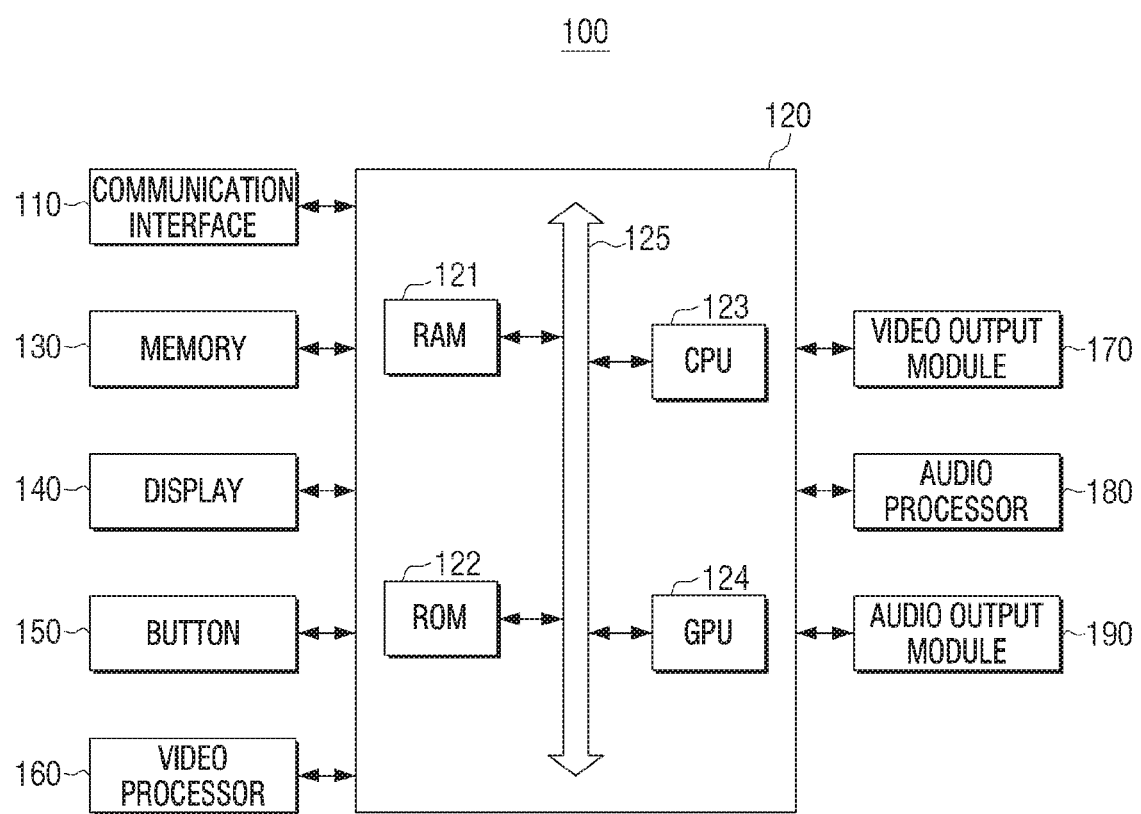
FIG. 3 is a block diagram illustrating a detailed configuration of the electronic device of FIG. 2, according to an embodiment.

FIG. 3 is a block diagram illustrating a detailed configuration of the electronic device of FIG. 2.

Referring to FIG. 3, the electronic device 100 may include the communication interface 110, the processor 120, a memory 130, a display 140, a button 150, a video processor 160, a video output module 170, an audio processor 180, and an audio output module 190.

Here, since the communication interface 110 is the same as the component illustrated in FIG. 2, an overlapped description is omitted.

The processor 120 may include a random access memory (RAM) 121, a read only memory (ROM) 122, a central processing unit (CPU) 123, a graphic processing unit (GPU) 124, and a bus 125. The RAM 121, the ROM 122, the CPU 123, the GPU 124, and the like, may be connected to each other through the bus 125.

The CPU 123 accesses the memory 130 to perform a booting using an operating system (O/S) stored in the memory 130. In addition, the CPU 123 performs various operations using various programs, contents, data, and the like stored in the memory 130.

An instruction set for booting a system, or the like, is stored in the ROM 122. When a turn-on command is input to supply power, the CPU 123 may copy the O/S stored in the memory 130 to the RAM 121 according to an instruction stored in the ROM 122, and execute the O/S to boot the system. When the booting is completed, the CPU 123 copies various programs stored in the memory 130 to the RAM 121, and executes the programs copied to the RAM 121 to perform various operations.

The GPU 124 displays a user interface (UI) on the display 140 when the booting of the electronic device 100 is completed. Specifically, the GPU 124 may generate a screen including various objects such as icons, images, texts, and the like, using a calculator and a renderer. The calculator calculates attribute values such as coordinate values, forms, sizes, colors, and the like at which the respective objects will be displayed depending on a layout of a screen. The renderer generates a screen of various layouts including the objects on the basis of the attribute values calculated in the calculator. The screen (or a user interface window) generated in the renderer is provided to the display 140 and is displayed on a main display region and a sub display region, respectively.

The memory 130 may store various programs and data required for an operation of the electronic device 100. Specifically, the memory 130 may store a parameter for processing an input image.

Specifically, the memory 130 may store voice data and fingerprint data for a plurality of users.

The processor 120 may identify the users by using the obtained data and the stored data. Specifically, the processor 120 may identify the user of the voice data having the most similar voice print to the obtained voice data of the stored voice data. In addition, the processor 120 may identify the user of the most similar fingerprint data to the obtained fingerprint data of the stored fingerprint data.

Specifically, the processor 120 may compare the obtained data with the stored data to obtain a score on a comparison result, and may compare the obtained score with a predetermined threshold value to identify the user.

Specifically, the processor 120 may compare the obtained voice data with voice data of the plurality of users stored in the memory 130, respectively, to calculate a degree of matching as a score. In addition, the processor 120 may identify a user of voice data that the score calculated using the voice data is the predetermined value or more. In addition, the processor 120 may compare the obtained fingerprint data with fingerprint data of the plurality of users stored in the memory 130, respectively, to calculate a degree of matching as a score. In addition, the processor 120 may identify a user of fingerprint data that the score calculated using the fingerprint data is the predetermined value or more. In this case, the predetermined value related to the voice data and the predetermined value related to the fingerprint data may be different values.

The processor 120 may correct the user identification result by reflecting surrounding environments. Specifically, the processor 120 may calculate a signal to noise ratio (SNR) from the obtained voice data, and may correct the score of the user identification result using the voice data by using the calculated signal to noise ratio. Alternatively, when a foreign material is recognized on a finger of the user or a fingerprint recognition button, the processor 120 may correct the score of the user identification result using the fingerprint data based on the recognition of the foreign material.

The processor 120 may differentially determine the access right to the electronic device 100 based on the result identified by using each data.

Specifically, when the user identified by using the voice data and the user identified by using the fingerprint data are matched to each other, the processor 120 may set the first access right to the identified user. Specifically, when the score on the user identification result using the voice data is the predetermined value or more and the score on the user identification result using the fingerprint data is the predetermined value or more, the processor 120 may determine that user recognition accuracy is very high and may set the first access right, which is the highest access right, to the identified user.

In this case, the processor 120 may provide contents corresponding to the first access right to the identified user. For example, when the identified user is set to the first access right, the processor 120 may allow the user to access personal information, personal contents, and the like, of high security level.

When the user is identified by only any one of the voice data and the fingerprint data, the processor 120 may set the second access right, which is lower than the first access right, to the identified user. Specifically, when one of the score on the user identification result using the voice data and the user identification result using the fingerprint data is the predetermined value or more, but the other thereof is less than the predetermined value, the processor 120 may set the second access right which is lower than the first access right, to the identified user. The second access right is lower than the first access right, but the processor 120 may allow the user to access information such as a usage history or the like having a lower security level in addition to the contents that have been published.

When the user is not identified by either the voice data or the fingerprint data, the processor 120 may set the lowest third access right to the identified user. Specifically, when both the score on the user identification result using the voice data and the score on the user identification result using the fingerprint data are less than the predetermined value, the processor 120 may allow the user to access only the published contents such as channel change.

It is hereinabove described that the access right is differentially allocated depending on whether or not the score on each identification result is the predetermined value or more, but in an actual implementation, the processor 120 may classify the access right into four or more and may differentially allocate the access right by using a score obtained by summing a result using the voice data and a result using the fingerprint data.

When the user identified by using the voice data and the user identified by using the fingerprint data are different, the processor 120 may identify the user having higher accuracy among the user identified by using the voice data and the user identified by using the fingerprint data, and may differentially allocate the access right to the identified user.

Here, the recognition accuracy refers to a probability of matching with an actual user, and when a difference between the score on the identification result and the predetermined threshold value is larger, it may be said that the recognition accuracy is higher.

Depending on a setting, the processor 120 may compare only the scores on the identification results and set the higher score to be higher in the recognition accuracy. Alternatively, depending on the setting, the processor 120 may also determine the user identified by using the fingerprint data as the user of the electronic device 100, and may also display a UI for confirming who the user is and a UI for additional authentication.

In addition, the processor 120 may compare the score on the identification result using the voice data of the user identified to have the higher recognition accuracy and the score on the identification result using the fingerprint data, respectively, with the predetermined threshold value to set the access right.

For example, when user A has the highest matching score using the voice recognition and user B has the highest matching score using fingerprint recognition, the processor 120 may identify user A as the user through the voice recognition and may identify user B as the user through the fingerprint recognition. As such, when the users identified by using each data are different, the processor 120 may select the user having higher recognition accuracy by using various methods described above. In this case, when the selected user is B, the processor 120 may determine the access right to user B by using voice data and fingerprint data for user B. Specifically, the processor 120 may differentially allocate the access right to the electronic device 100 depending on whether or not a score on user B calculated using the voice data and a score on user B calculated using the fingerprint data, respectively, are the predetermined value or more. In this case, the score on user B calculated using the voice data may be lower than the score on user A.

The memory 130 may match and store executable functions and accessible files, contents, applications, and the like for each of a plurality of access rights. The processor 120 may provide the files, the contents, the applications, and the like matched for the access rights and stored in the memory 130 depending on the determined access right.

The display 140 may display a screen corresponding to an image signal by a control of the processor 120. Specifically, the display 140 may display contents by the control of the processor 120, or may display a UI for providing information to the user or a UI for receiving a confirmation of the user.

The display 140 may be implemented in various types of displays such as a liquid crystal display (LCD), an organic light emitting diode (OLED) display, and a plasma display panel (PDP). The display 140 may also include a driving circuit, a backlight unit, and the like which may be implemented in the form of an a-si TFT, a low temperature poly silicon (LTPS) TFT, an organic TFT (OTFT), or the like. In addition, the display 140 may also be implemented as a flexible display. In addition, according to various embodiments, when the electronic device 100 is implemented in a set-top box, a server, or the like, the electronic device 100 may also not include the display 140. An operation of the electronic device 100 of the case in which the electronic device 100 does not include the display 140 will hereinafter be described in detail with reference to FIGS. 12 and 13.

The button 150 may be various types of buttons such as a mechanical button, a touch pad, and a wheel formed in any region of a front portion, a side portion, a rear portion, and the like of a body appearance of the electronic device 100.

Specifically, the button 150 may be the button for receiving the voice data and the fingerprint data of the user. For example, the user may press a button for voice input to the electronic device 100 and input voice, and in this case, when a fingerprint recognition function is provided on a surface of the button, the electronic device 100 may simultaneously receive a fingerprint of the user. Such a button may be provided in the electronic device 100, or may also be provided in the remote controller communicating with the electronic device 100.

The video processor 160 is a component for processing video data included in the contents received through the communication interface 110 or the contents stored in the memory 130. The video processor 160 may perform various kinds of image processing such as decoding, scaling, noise filtering, frame rate conversion, resolution conversion, and the like, for the video data.

The video output module 170 may output the video data processed by the video processor 160. In this case, when the electronic device 100 includes the display 140, the video output module 170 may be the same component as the display 140, but when the electronic device 100 does not include the display 140 or it is intended to display an image on an external display device, the video output module 170 may be a port form that provides an image signal to the external display device.

The audio processor 180 is a component for processing audio data included in the contents received through the communication interface 110 or the contents stored in the memory 130. The audio processor 180 may perform various kinds of processing such as decoding, amplifying, noise filtering, and the like, for the audio data.

When a reproduction application for multimedia contents is executed, the processor 120 may drive the video processor 160 and the audio processor 180 to reproduce the multimedia contents. In this case, the display 140 may display an image frame created by the video processor 160 on at least one of a main display region and a sub display region.

The audio output module 190 outputs the audio data created by the audio processor 180. In this case, the audio output module 190 may also be a component that converts a voice signal into a sound and outputs the sound such as a speaker included in the electronic device 100, and may also be a port form that provides the voice signal to an external speaker.

It is hereinabove described that the video output module 170 and the audio output module 190 are separate components, but when the electronic device 100 includes a HDMI port, or the like that simultaneously transmits the video signal and the audio signal, the video output module 170 and the audio output module 190 may be physically implemented in one component.

When the image is transmitted to the external display device through the video output module 170 described above, the processor 120 may add a graphic user interface (GUI) to the transmitted image and transmit the image. Specifically, the processor 120 may transmit an image that the GUI is added to the image output from the video processor 160 to the external display device.

According to an embodiment, a universal serial bus (USB) port to which a USB connector may be connected, a HDMI port, a headset, a mouse, various external input ports for connection with various external terminals such as a local area network (LAN), and the like, a digital multimedia broadcasting (DMB) chip receiving and processing a DMB signal, various sensors, a microphone for receiving sound, a camera for imaging a still image or a moving image, and the like, may be further include in the electronic device 100.

Figure 4:
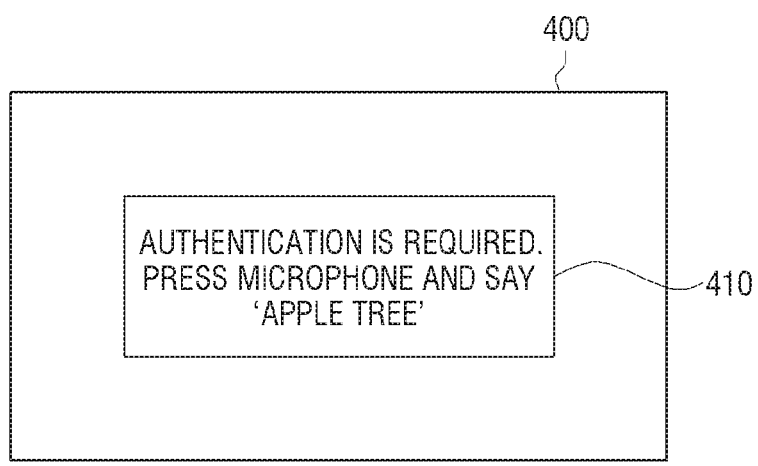
FIG. 4 is a view illustrating an example of a user interface (UI) screen displayed in a standby mode of the electronic device.

FIG. 4 is a view illustrating an example of a user interface (UI) screen displayed in a standby mode of the electronic device;

Referring to FIG. 4, the electronic device may display a UI screen 400 including a message 410 for performing user authentication. Specifically, when the electronic device receives a manipulation of a user in a standby mode, the electronic device may display the UI screen 400 including the message 410 for performing the user authentication. In this case, the standby mode may be a power saving mode in which some components of the electronic device are not powered, and the display may be a black screen.

When the electronic device receives a content execution command that requires authentication as well as in the standby mode, the electronic device may display the UI screen 400 including the message 410 for performing the user authentication.

The message 410 for performing the user authentication in FIG. 4 may provide an operation for authentication and a word for voice recognition. Here, the voice recognition may include an operation of identifying a voice print of the user. In FIG. 4, the description is limited to the case in which the fingerprint operation is performed by the operation of pushing the microphone button, but in an actual implementation, the fingerprint recognition operation may be separately performed, and the electronic device may further display a UI screen requesting the fingerprint recognition.

When the user knows a word for voice recognition or the voice recognition is possible regardless of the word, the electronic device 100 may perform an authentication procedure when the manipulation of the user is input without displaying the message 410.

Figure 5:
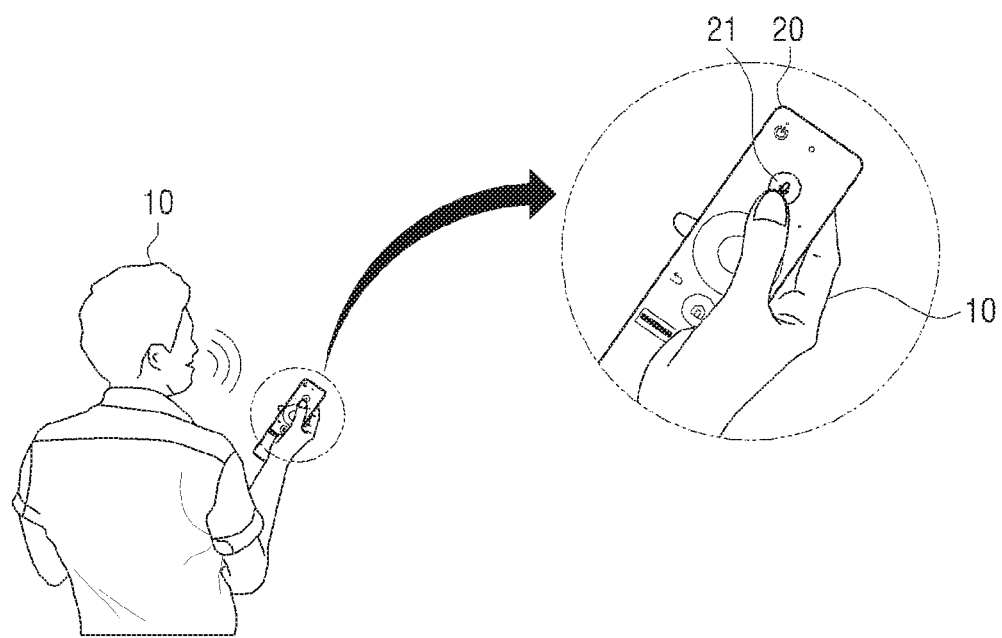
FIG. 5 is a view illustrating an example of an operation of a user for controlling the electronic device, according to an embodiment.

The user may perform an operation illustrated in FIG. 5 after confirming the UI screen 400 illustrated in FIG. 4.

FIG. 5 is a view illustrating an example of an operation of a user for controlling the electronic device.

Referring to FIG. 5, a user 10 may input a voice command by using the remote controller 20. Specifically, the user 10 may push a voice input button 21 included in the remote controller 20 and input the voice command. In this case, the voice command may be input through a microphone included in the remote controller 20, or input through the microphone of the electronic device or the external microphone. Specifically, the user 10 may push the button 21 and then input the voice command, or may also input the voice command in a state in which the button 21 is pushed. Here, the button 21 may be a fingerprint recognizable button.

That is, the user 10 may input fingerprint data through the button 21 of the remote controller 20 while pushing the button 21 to input the voice command.

Although FIG. 5 illustrates that the button 21 for inputting the voice command may perform the fingerprint recognition, a button for fingerprint recognition may also be separately included in the remote controller 20. In addition, when the user does not want to execute personal contents, the user may input only any one of the voice command and the fingerprint recognition so that the access right is intentionally determined to be low.

FIGS. 6A to 8 are views illustrating various examples of a UI screen according to access right of the electronic device according to an embodiment.

Figure 6A:
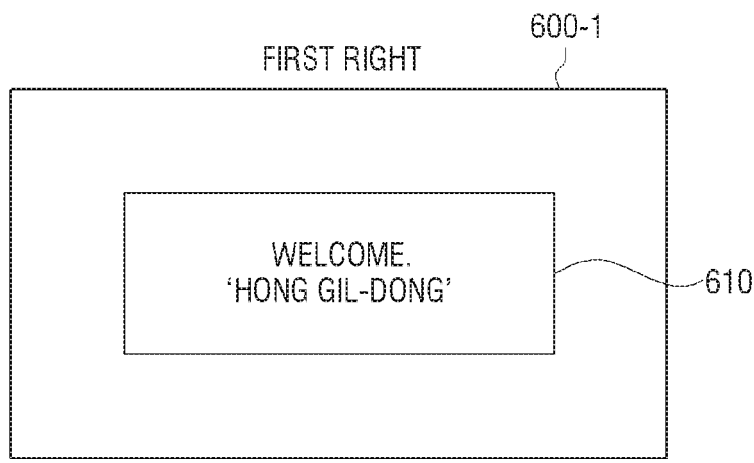
Figure 6B:
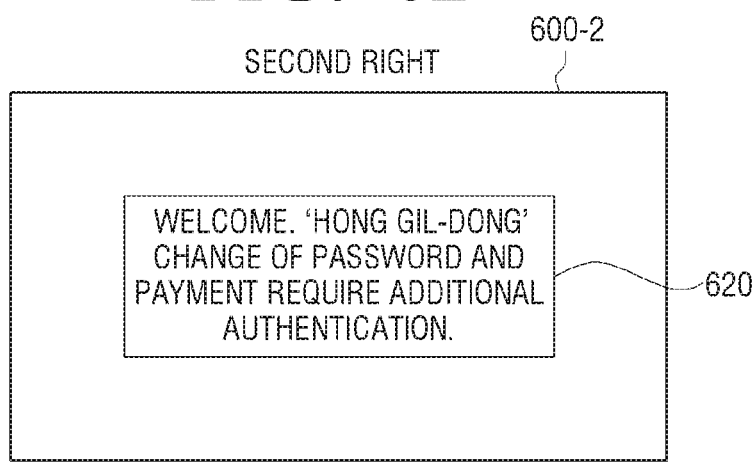
Figure 6C:
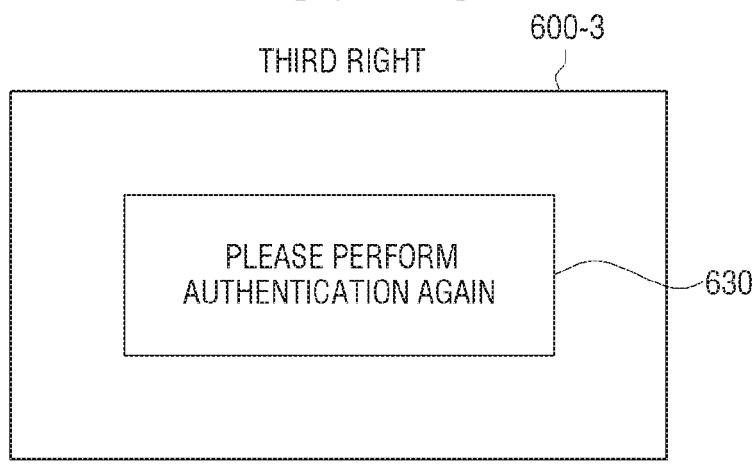

FIGS. 6A to 6C illustrate examples of the UI screen displayed after the access right of the user is determined. Specifically, FIG. 6A illustrates an example of the UI screen of a case in which the highest first access right is selected as the access right of the user, FIG. 6B illustrates an example of the UI screen of a case in which the second access right which is lower than the first access right is selected as the access right of the user, and FIG. 6C illustrates an example of the UI screen of a case in which the third access right, which is the lowest access right, is selected as the access right of the user. That is, the electronic device may display different UI screens depending on the access rights determined for the identified user.

Referring to FIG. 6A, when the access right of the user is determined to be the highest first access right, the electronic device may display a UI screen 600-1 including a message 610 displaying information on the identified user.

Referring to FIG. 6B, when the access right of the user is determined to be the second access right which is lower than the first access right, the electronic device may display a UI screen 600-2 including a message 620 displaying information on the identified user and displaying that additional authentication is required for a particular function. For example, the electronic device may notify that additional authentication is required for functions requiring high security, such as accessing personal information of the user or payment.

Figure 8:
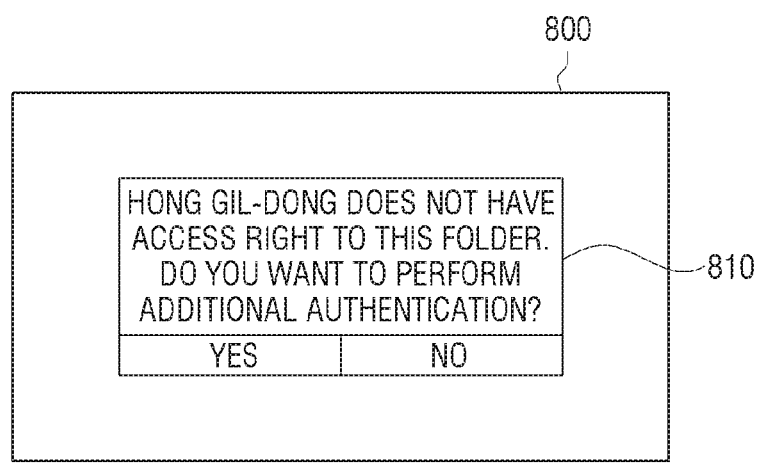

Referring to FIG. 6C, when the access right of the user is determined to be the lowest third access right, the electronic device may display a UI screen 600-3 including a message 630 that requests authentication execution again. The electronic device may also perform only a general TV function without displaying a message requesting additional authentication execution. In this case, when the user inputs a function execution command required for authentication, the electronic device may display a UI screen requesting additional authentication as illustrated in FIG. 8.

The electronic device may also display different messages depending on the access rights of the identified user as illustrated in FIGS. 6A to 6C, but may also display the UI screen different applications depending on the determined access right without displaying the separate messages as illustrated in FIGS. 7A and 7B. Although FIGS. 7A and 7B illustrate that the electronic device is a smartphone, the UI screen illustrated in FIGS. 7A and 7B is applicable to a case in which the electronic device is a TV.

Specifically, FIG. 7A illustrates a UI screen displayed in a case in which the access right of the user is determined to be higher than the access right of FIG. 7B. For example, FIG. 7A illustrates a UI screen 710 displayed in a case in which the access right of the user is determined to be the first access right, and FIG. 7B illustrates a UI screen 720 displayed in a case in which the access right of the user is determined to be the second access right which is lower than the first access right.

Referring to FIG. 7A, the UI screen 710 of the case in which the access right of the user is determined to be the first access right may include applications such as a contact, a photobook, SNS, and the like which contain personal information of the user. On the contrary, referring to FIG. 7B, the UI screen 720 of the case in which the access right of the user is determined to be the second access right may exclude the applications including the personal information of the user.

That is, the electronic device may display different applications depending on the access rights determined for the identified user.

This is merely one example, and even in a case in which the access right of the user is determined to be the second access right, the electronic device may display the UI screen including all applications including the personal information as illustrated in FIG. 7A. In this case, when the user inputs an application execution command including the personal information, the electronic device may display a UI for additional authentication as illustrated in FIG. 8.

As described above, an effect of enhancing security may be expected by displaying different UI screens depending on the access rights determined for the identified user.

Referring to FIG. 8, the electronic device may display a UI screen 800 including a message 810 requesting additional authentication. Specifically, when the user inputs a command to perform a function exceeding the determined access right, the electronic device may display the UI screen 800 for additional authentication.

For example, when the user inputs a feedback to perform additional authentication, the electronic device may allow the user to perform authentication again using the voice and fingerprint, or may allow the user to perform additional authentication by using an additional password input such as a password, a mobile phone authentication, a public authentication certificate, and the like.

If the user succeeds in the additional authentication, the electronic device may change the access right determined for the user to a higher access right.

Figure 9:
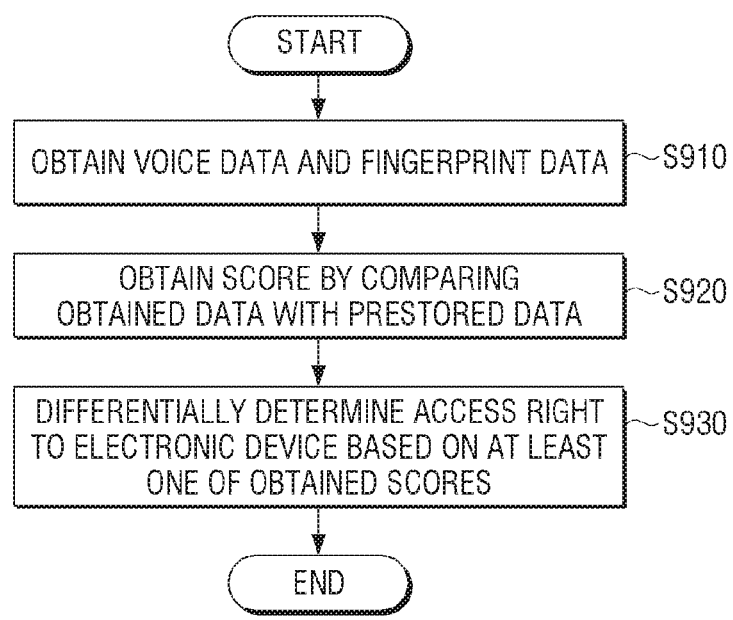
FIG. 9 is a flowchart illustrating a control method of an electronic device according to an embodiment.

FIG. 9 is a flowchart illustrating a control method of an electronic device according to an embodiment.

First, the electronic device may obtain voice data and fingerprint data (S910). Specifically, the electronic device may receive at least one of the voice data and the fingerprint data through an external device. Alternatively, the electronic device may receive the voice data and the fingerprint data through a microphone and a fingerprint recognition button included in the electronic device.

Next, the electronic device may compare the obtained data with prestored data to obtain a score (S920). Specifically, the prestored data may include the voice data and the fingerprint data for each of a plurality of users. The electronic device may compare the obtained voice and fingerprint data with the prestored voice and fingerprint data of the plurality of users to identify the users, and allocate access right of the identified user to the electronic device.

The electronic device may identify the user by using the voice data and may identify the user by using the fingerprint data. In this case, the electronic device may identify each of the users by using the obtained voice data and fingerprint data.

Specifically, the electronic device may compare the obtained voice data with the prestored voice data for the plurality of users, and may identify the user of the voice data having a voice printed most similar to the obtained voice data. In this case, the electronic device may calculate the degree of similarity between the obtained data and the prestored data as a score to identify the user of the voice data having the highest score. The electronic device may compare the obtained fingerprint data with the prestored fingerprint data for the plurality of users, and may identify the user of the fingerprint data most similar to the obtained voice data. In this case, the electronic device may calculate the degree of similarity between the obtained data and the prestored data as a score to identify the user of the voice data having the highest score.

Next, the electronic device may differentially determine the access right to the electronic device based on at least one of the score obtained by using the voice data and the score obtained by using the fingerprint data (S930). Specifically, the electronic device may differentially determine the access right depending on whether or not the score on the user identification result using the voice data and the score on the user identification result using the fingerprint data exceed a predetermined value, respectively. The method of determining the access right described above will hereinafter be described in detail with reference to FIG. 10.

Figure 10:
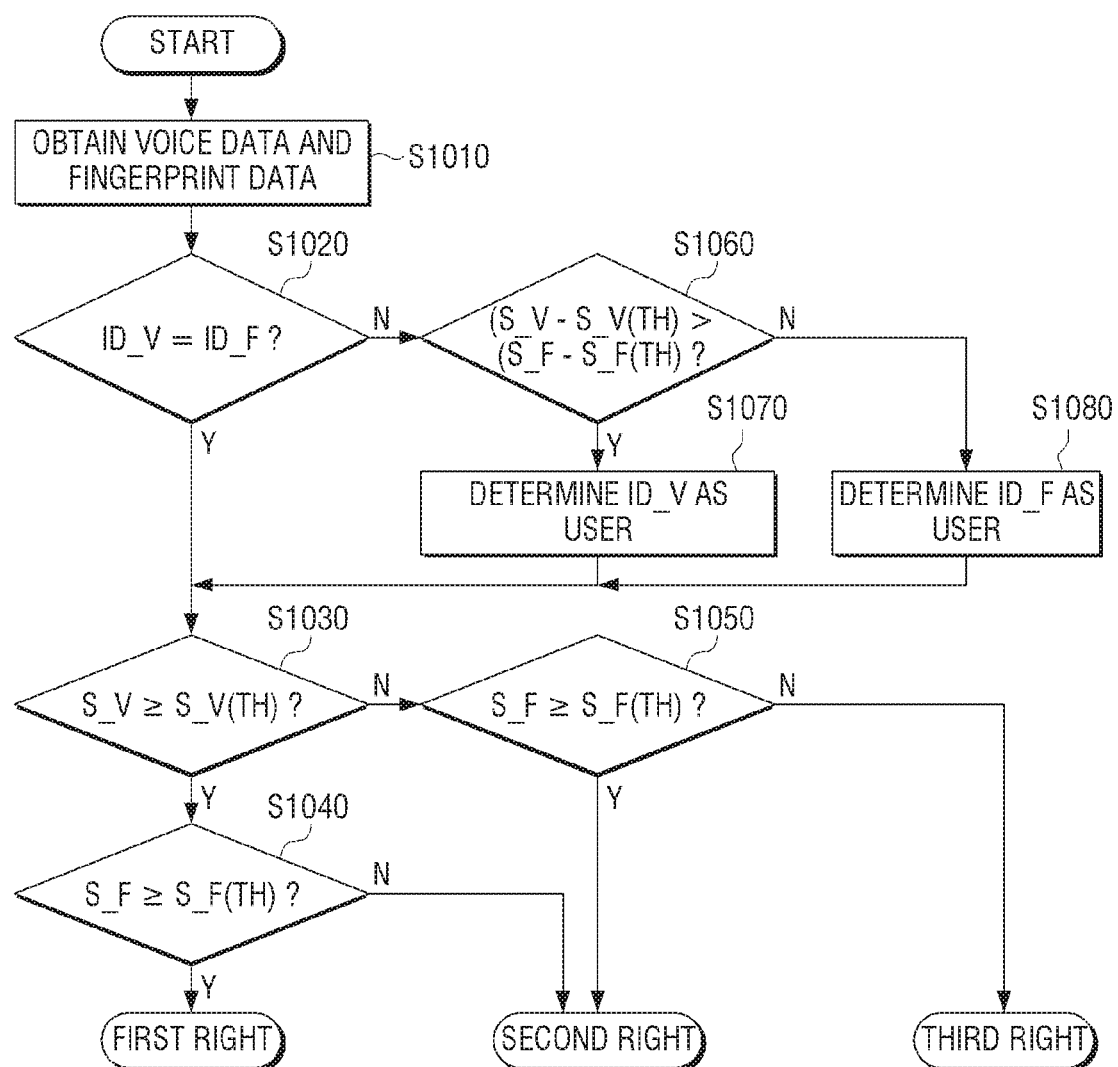
FIG. 10 is a flowchart illustrating a method for determining access right in more detail, according to an embodiment.

FIG. 10 is a flowchart illustrating a method for determining access right in more detail.

First, the electronic device may obtain the voice data and the fingerprint data (S1010).

Next, the electronic device may determine whether or not a user (ID_V) identified using the voice data and a user (ID_F) identified using the fingerprint data are matched to each other (S1020). Specifically, the electronic device may compare the received voice data and fingerprint data with the stored voice data and fingerprint data for the plurality of users to thereby calculate match scores, respectively, and to identify the user having the highest calculated matching score.

If the user (ID_V) identified using the voice data and the user (ID_F) identified using the fingerprint data are matched to each other (Yes in S1020), the electronic device may determine whether or not a score (S-V) on the voice identification result of the identified user is a predetermined threshold value (S_V(TH)) or more of the voice identification result (S1030).

If the score (S-V) on the voice identification result of the identified user is the predetermined threshold value (S_V(TH)) or more of the voice identification result (Yes in S1030), the electronic device may determine whether or not a score (S-F) on the fingerprint identification result of the identified user is a predetermined threshold value (S_F(TH)) or more of the fingerprint identification result (S1040).

In this case, if the score (S-F) on the fingerprint identification result of the identified user is the predetermined threshold value (S_F(TH)) or more of the fingerprint identification result (Yes in S1040), the electronic device may determine the access right of the identified user to be a first right. Here, the first right may be the highest access right of a plurality of access rights. That is, if both the score on the identification result using the voice data and the score on the identification result using the fingerprint data are the predetermined value or more, the electronic device may allocate the highest right to the identified user.

If the score (S-F) on the fingerprint identification result of the identified user is less than the predetermined threshold value (S_F(TH)) of the fingerprint identification result (No in S1040), the electronic device may determine the access right of the identified user to be a second right which is lower than the first right.

If the score (S-V) on the voice identification result of the identified user is less than the predetermined threshold value (S_V(TH)) of the voice identification result (No in S1030), the electronic device may determine whether or not the score (S-F) on the fingerprint identification result of the identified user is the predetermined threshold value (S_F(TH)) or more of the fingerprint identification result (S1050).

In this case, if the score (S-F) on the fingerprint identification result of the identified user is the predetermined threshold value (S_F(TH)) or more of the fingerprint identification result (Yes in S1050), the electronic device may determine the access right of the identified user to be the second right. That is, if any one of the score on the identification result using the voice data and the score on the identification result using the fingerprint data is the predetermined value or more, the electronic device may allocate a limited access right rather than the highest right to the identified user.

If the score (S-F) on the fingerprint identification result of the identified user is less than the predetermined threshold value (S_F(TH)) of the fingerprint identification result (No in S1050), the electronic device may determine the access right of the identified user to be the lowest third right.

If the user (ID_V) identified by using the voice data and the user (ID_F) identified by using the fingerprint data are different (No in S1020), the electronic device may identify the user having a higher recognition accuracy among the user (ID_V) identified by using the voice data and the user (ID_F) identified by using the fingerprint data.

Specifically, the electronic device may determine whether or not a difference between the score (S-V) on the voice identification result and the predetermined value (S_V(TH)) of the voice identification result is greater than a difference between the score (S-F) on the fingerprint identification result and the predetermined value (S_F(TH)) of the fingerprint identification result (S1060).

In this case, if the difference between the score (S-V) on the voice identification result and the predetermined value (S_V(TH)) of the voice identification result is greater than the difference between the score (S-F) on the fingerprint identification result and the predetermined value (S_F(TH)) of the fingerprint identification result (Yes in S1060), the electronic device may determine the user the user (ID_V) identified by using the voice data as the user (S1070). If the difference between the score (S-F) on the fingerprint identification result and the predetermined value (S_F(TH)) of the fingerprint identification result is greater than the difference between the score (S-V) on the voice identification result and the predetermined value (S_V(TH)) of the voice identification result (No in S1060), the electronic device may determine the user (ID_F) identified by using the fingerprint data as the user (S1080).

Next, the electronic device may determine the access right through the operations S1030 to S1050 using the score (S-V) on the voice identification result and the score (S-F) on the fingerprint identification result of the determined user.

It is hereinabove described that the user is identified by using the scores of the identification results, but the disclosure is not limited thereto, and the electronic device may prioritize the identification result using the fingerprint data according to the setting or may also determine a matched access right of the access rights divided into a plurality of levels using a summed score on the identification results, and may display a UI screen requesting a confirmation to the user or may also display a UI screen requesting authentication execution again.

Figure 11:
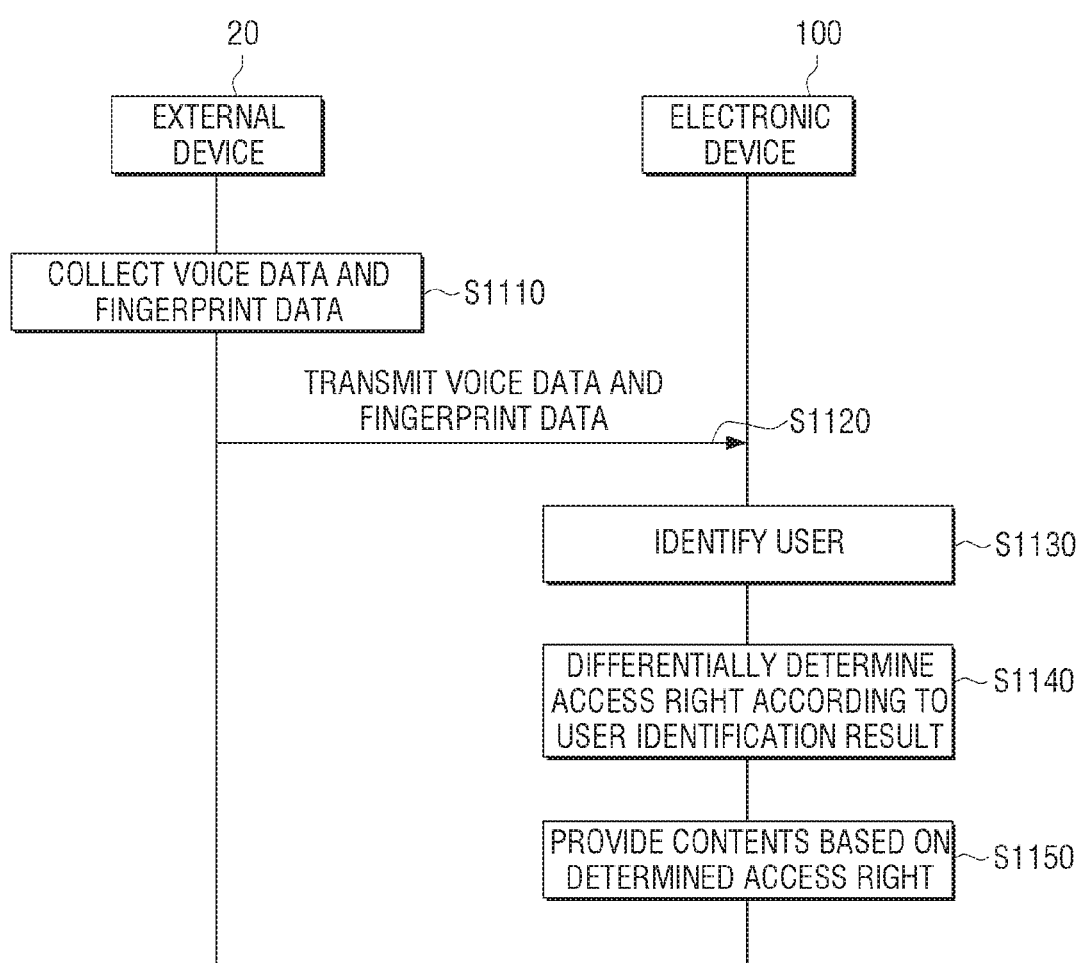
FIGS. 11 to 13 are sequence views illustrating various examples an operation of the electronic device according to an embodiment.
Figure 12:
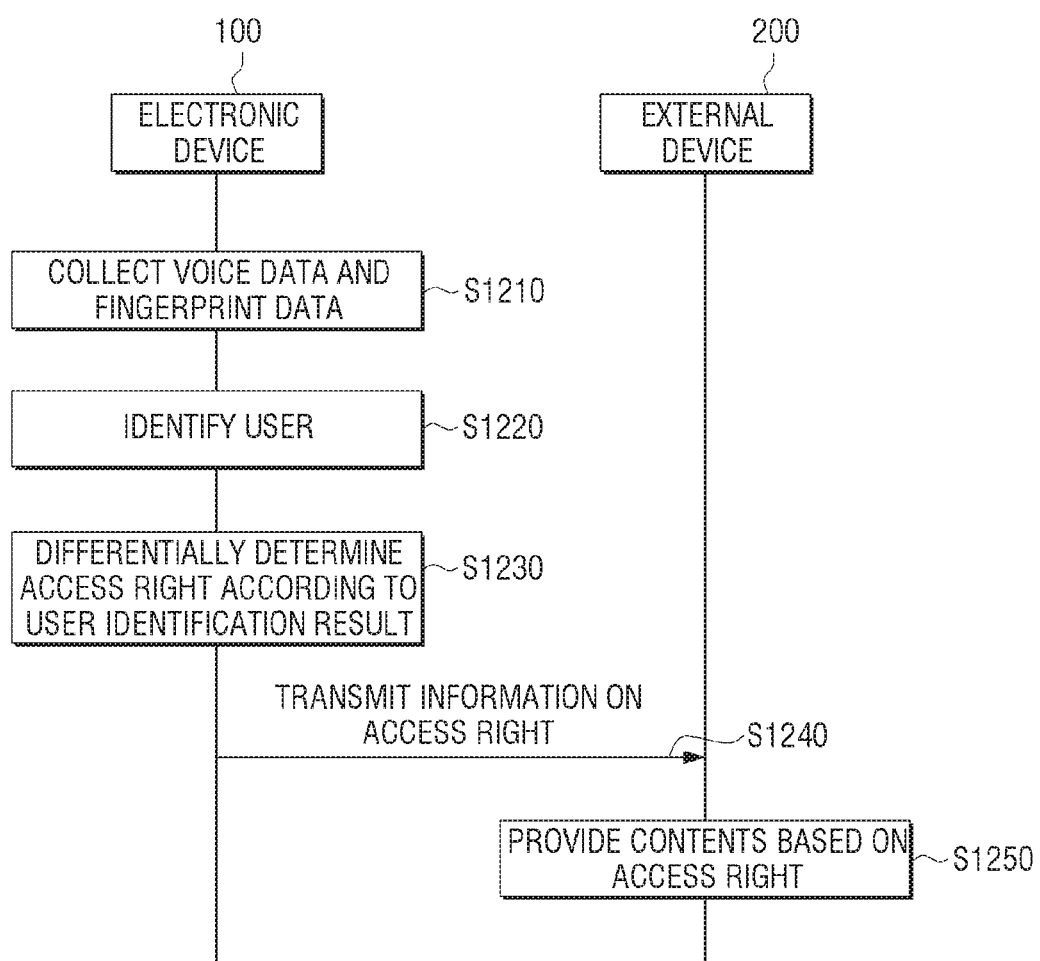

FIGS. 11 and 12 are sequence views illustrating various examples of an operation of the electronic device according to an embodiment.

Specifically, FIG. 11 is a sequence view illustrating an example in which the electronic device 100 determines the access right using the data received from the external device 20, and performs an operation based on the determined access right.

First, the external device 20 may collect the voice data and the fingerprint data (S1110). In this case, the external device 20 may be a remote controller for controlling the electronic device 100. Here, the remote controller may be a remote controller dedicated to the electronic device 100 or a smartphone installed with an application capable of controlling the electronic device 100.

Next, the external device 20 may transmit the voice data and the fingerprint data to the electronic device 100 (S1120).

The electronic device 100 may identify each of the users by using the received voice data and fingerprint data (S1130). In this case, the voice data and the fingerprint data for the plurality of users used to identify the users may be the data which is stored in advance in the electronic device 100, or the data received from an external server. In this case, when the voice data and the fingerprint data for the plurality of users are received from the external server, the electronic device 100 may request the data for the plurality of users to the external server when the collected voice data and the fingerprint data are transmitted, or may also request the data for the plurality of users when a screen for log in is displayed before the data is collected.

Specifically, the electronic device 100 may compare the voice data of the plurality of users prestored in the electronic device 100 or the voice data of the plurality of users received from the external server with the collected voice data to calculate a matching score, and may identify the user having the highest calculated matching score as the user for the voice data. The electronic device 100 may compare the fingerprint data of the plurality of users prestored in the electronic device 100 or the fingerprint data of the plurality of users received from the external server with the collected fingerprint data to calculate a matching score, and may identify the user having the highest calculated matching score as the user for the fingerprint data.

In this case, if the user for the voice data and the user for the fingerprint are matched to each other, the electronic device 100 may perform the following operation of determining the access right using the matched scores of the users. If the user for the voice data and the user for the fingerprint are different from each other, the electronic device 100 may determine which user of the user for the voice data and the user for the fingerprint data to identify. Since this is described in the description of FIG. 10, the overlapped description is omitted.

Next, the electronic device 100 may differentially determine the access right depending on the user identification result (S1140), and may provide contents based on the determined access right (S1150). In this case, the providable contents matched to each access right may be stored in advance in the electronic device 100 or received from the external server.

COMMUNICATION INTERFACE FIG. 12 is a sequence view for describing an example in which the electronic device 100 determines the access right using the directly received data, and performs an operation based on the determined access right.

First, the external device 100 may collect the voice data and the finger data (S1210). In this case, the electronic device 100 may be a remote controller dedicated to the external device 200 including a microphone and a fingerprint recognition button for data collection, or a smartphone installed with an application capable of controlling the external device 200.

Next, the electronic device 100 may identify each of the users by using the collected voice data and fingerprint data (S1220). In this case, the voice data and the finger data for the plurality of users used to identify the users may be the data which is stored in advance in the electronic device 100, or the data received from an external server (not shown). In this case, when the voice data and the finger data for the plurality of users are received from the external server, the electronic device 100 may request the data for the plurality of users to the external server when the collected voice data and the fingerprint data are transmitted, or may also request the data for the plurality of users when a screen for log in is displayed before the data is collected.

Specifically, the electronic device 100 may compare the voice data of the plurality of users prestored in the electronic device 100 or the voice data of the plurality of users received from the external server with the collected voice data to calculate a matching score, and may identify the user having the highest calculated matching score as the user for the voice data. The electronic device 100 may compare the fingerprint data of the plurality of users prestored in the electronic device 100 or the fingerprint data of the plurality of users received from the external server with the collected fingerprint data to calculate a matching score, and may identify the user having the highest calculated matching score as the user for the fingerprint data.

In this case, if the user for the voice data and the user for the fingerprint are matched to each other, the electronic device 100 may perform the following operation of determining the access right using the matched scores of the users. If the user for the voice data and the user for the fingerprint are different from each other, the electronic device 100 may determine which user of the user for the voice data and the user for the fingerprint data to identify. Since this is described in the description of FIG. 10, the overlapped description is omitted.

Next, the electronic device 100 may differentially determine the access right depending on the user identification result (S1230), and may transmit information on the determined access right to the external device (S1240). Specifically, the electronic device 100 may compare the matching score of the voice data of the identified user with the predetermined threshold value for the voice data and compare the matching score of the fingerprint data of the identified user with the predetermined threshold value for the fingerprint data, and differentially determine the access right depending on the comparison result.

In addition, the external device 200 may provide contents based on the received access right (S1250). In this case, the providable contents matched to each access right may be stored in advance in the external device 200 or received from the external server.

Figure 13:
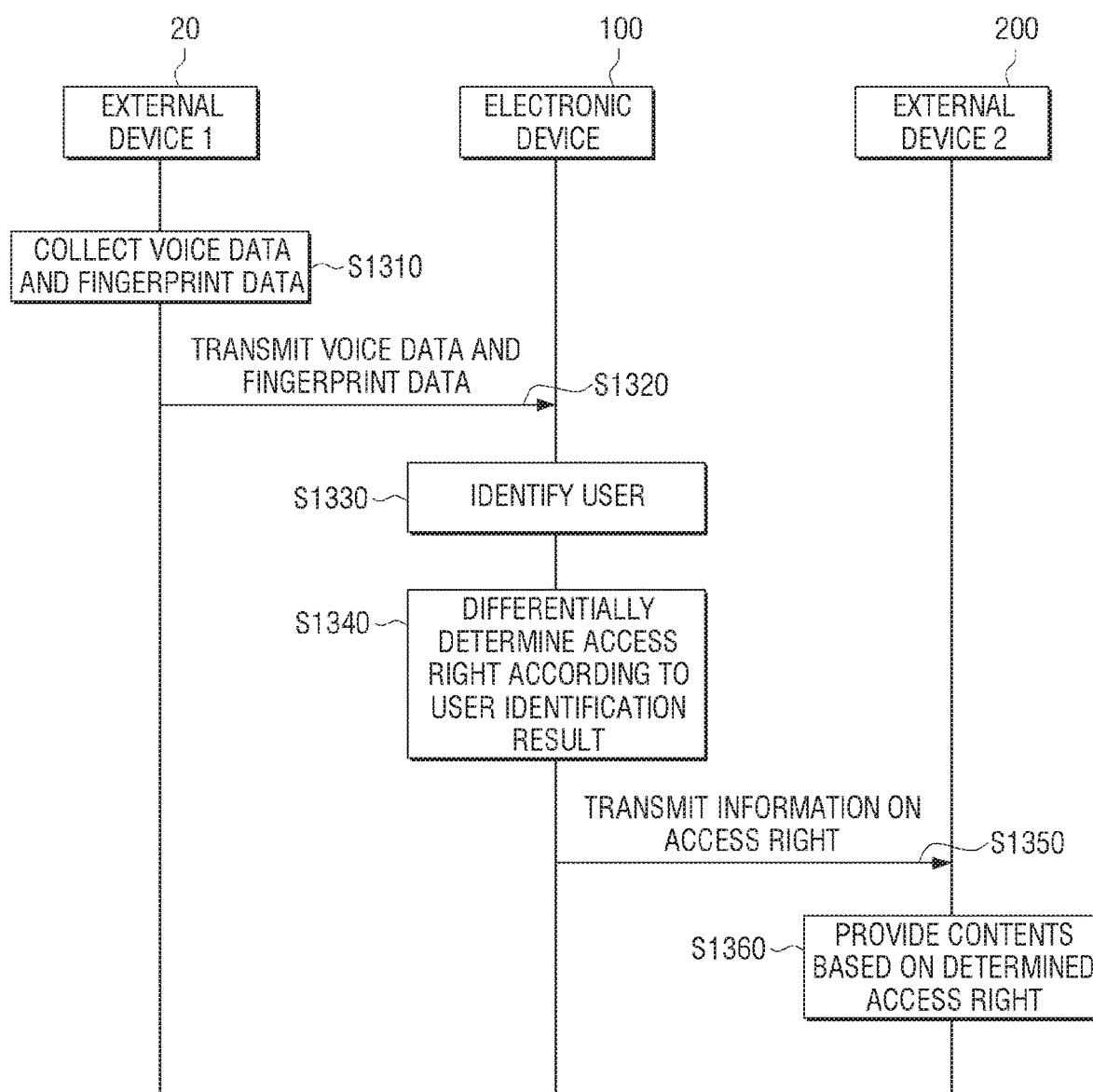

It is hereinabove described that the operations of identifying the users and determining the access right are performed in the same electronic device 100, but in an actual implementation, the operation of identifying the users, the operation of determining the access right, and the operation of providing the contents may also be performed in different devices, respectively, as illustrated in FIG. 13.

FIG. 13 is a sequence view for describing an example in which the electronic device 100 determines the access right using the data received from an external device 1 20 and transmits information on the determined access right to an external device 2 200 to allow the external device 2 200 to perform an operation based on the access right. Specifically, the electronic device 100 may be a server that processes the data received from the outside and transmits the processed information to the outside.

First, the external device 1 20 may collect the voice data and the finger data (S1310). In this case, the external device 1 20 may be a remote controller for controlling the electronic device 100. Here, the remote controller may be a remote controller dedicated to the electronic device 100, an external microphone communicating with the electronic device 100, a smartphone installed with an application capable of controlling the electronic device 100, and the like.

Next, the external device 1 20 may transmit the voice data and the fingerprint data to the electronic device 100 (S1320).

Next, the electronic device 100 may identify each of the users by using the collected voice data and fingerprint data (S1330). In this case, the voice data and the finger data for the plurality of users used to identify the users may be the data which is stored in advance in the electronic device 100, or the data received from an external server. In this case, when the voice data and the finger data for the plurality of users are received from the external server, the electronic device 100 may request the data for the plurality of users to the external server when the collected voice data and the fingerprint data are transmitted, or may also request the data for the plurality of users when a screen for log in is displayed before the data is collected.

Specifically, the electronic device 100 may compare the voice data of the plurality of users prestored in the electronic device 100 or the voice data of the plurality of users received from the external server with the collected voice data to calculate a matching score, and may identify the user having the highest calculated matching score as the user for the voice data. The electronic device 100 may compare the fingerprint data of the plurality of users prestored in the electronic device 100 or the fingerprint data of the plurality of users received from the external server with the collected fingerprint data to calculate a matching score, and may identify the user having the highest calculated matching score as the user for the fingerprint data.

In this case, if the user for the voice data and the user for the fingerprint are matched to each other, the electronic device 100 may perform the following operation of determining the access right using the matched scores of the users. If the user for the voice data and the user for the fingerprint are different from each other, the electronic device 100 may determine which user of the user for the voice data and the user for the fingerprint data to identify. Since this is described in the description of FIG. 10, the overlapped description is omitted.

Next, the electronic device 100 may differentially determine the access right depending on the user identification result (S1340), and may transmit information on the determined access right to the external device 2 200 (S1350). Here, the external device 2 200 may be a display device including a display, or a server in which the contents providable to the display device are stored.

In addition, the external device 2 200 may provide the contents based on the received access right (S1360). In this case, the providable contents matched to each access right may be stored in advance in the electronic device 100 or the external device 200, or received from the external server. In addition, here, providing the contents may be to display the contents based on the access right, or to transmit the contents based on the access right so that the other device displays the contents.

FIG. 13 illustrates that the external device 1 20 and the external device 2 200 are separate components, but when the external device 2 200 obtains the voice data and the fingerprint data and transmits them to the electronic device 100, the external device 1 20 and the external device 2 200 may be the same component.

As described above, it is possible to expect an effect of improving an accuracy of user identification and enhancing security by differentially allocating the access right to the users identified by using both the voice data and the fingerprint data.

The embodiments described above may be implemented in a computer or a computer readable recording medium using software, hardware, or a combination of software and hardware. According to a hardware implementation, embodiments described may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, embodiments described may be implemented by the processor itself. According to a software implementation, the embodiments such as procedures and functions described may be implemented by separate software modules. Each of the software modules may perform one or more functions and operations described in the disclosure.

The control method of the electronic device according to the embodiments described above may be stored in a non-transitory readable medium. The non-transitory readable medium may be mounted and used in various apparatuses.

The non-transitory readable medium is not a medium that stores data therein for a while, such as a register, a cache, a memory, or the like, but means a medium that semi-permanently stores data therein and is readable by an apparatus. In detail, programs for performing the diverse methods described above may be stored and provided in the non-transitory readable medium such as a compact disc (CD), a digital versatile disc (DVD), a hard disc, a Blu-ray disc, a universal serial bus (USB), a memory card, a read only memory (ROM), or the like.

According to an embodiment, the methods according to the embodiments according to the present disclosure may be included and provided in a computer program product. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In the case of the online distribution, at least portion of the computer program product may be at least temporarily stored in a storage medium such as a memory of a server of a manufacturer, a server of an application store, or a relay server, or be temporarily generated.

Although embodiments have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the present disclosure.

What is claimed is:

1. An electronic device comprising:
a communication interface comprising communication circuitry; and
a processor configured to:
identify a first user among a plurality of users by comparing voice data received through the communication interface with voice data for the plurality of users;
identify a second user among the plurality of users by comparing fingerprint data received through the communication interface with fingerprint data for the plurality of users; and
differentially identify an access right to the electronic device based on the first user and the second user.

2. The electronic device as claimed in claim 1, further comprising a memory configured to store the voice data for the plurality of users and the fingerprint data for the plurality of users,
wherein the processor is further configured to:
identify the first user, among the plurality of users, having a highest voice score as the first user for the received voice data; and
identify the second user, among the plurality of users, having a highest fingerprint score as the second user for the received fingerprint data.

3. The electronic device as claimed in claim 2, wherein the processor is further configured to identify the first user having the highest voice score depending on whether the voice score of the first user for the received voice data is greater than or equal to a predetermined threshold value, and identify the second user having the highest fingerprint score depending on whether the fingerprint score of the second user for the received fingerprint data is greater than or equal to the predetermined threshold value.

4. The electronic device as claimed in claim 3, wherein the processor is further configured to identify that a user has a first access right when the first user having the highest voice score and the second user having the highest fingerprint score are matched to each other, and identify that a user has a second access right, which is lower than the first access right, when the first user having the highest voice score and the second user having the highest fingerprint score are not matched to each other.

5. The electronic device as claimed in claim 3, wherein the processor is further configured to, when the first user having the highest voice score and the second user having the highest fingerprint score are different from each other, identify a user having higher recognition accuracy among the first user having the highest voice score and the second user having the highest fingerprint score.

6. The electronic device as claimed in claim 3, wherein the processor is further configured to obtain a signal to noise ratio based on the received voice data, and adjust the voice score of the first user based on the obtained signal to noise ratio.

7. The electronic device as claimed in claim 1, wherein the processor is further configured to obtain a control command by recognizing the received voice data, and identify whether the obtained control command is performed based on the obtained control command and the identified access right.

8. The electronic device as claimed in claim 7, wherein the processor is further configured to provide a user interface screen for additional authentication when the obtained control command is not performed by the identified access right, and change the identified access right when the additional authentication is performed through the provided user interface screen.

9. The electronic device as claimed in claim 7, wherein the processor is further configured to control the communication interface to transmit information about the identified access right to an external device, when the obtained control command is performed by the identified access right.

10. A control method of an electronic device, the control method comprising:
   identify a first user among a plurality of users by comparing voice data received through a communication interface with voice data for the plurality of users;
   identify a second user among the plurality of users by comparing fingerprint data received through the communication interface with fingerprint data for the plurality of users; and
   differentially identifying an access right to the electronic device based on the first and the second user.

11. The control method as claimed in claim 10, wherein the identifying the first user comprises identifying the first user, from among the plurality of users, having a highest voice score by comparing the received voice data with voice data for the plurality of users as the first user for the received voice data; and
   wherein the identifying the second user comprises identifying the second user having a highest fingerprint score by comparing received the fingerprint data with the fingerprint data for the plurality of users as the second user for the received fingerprint data.

12. The control method as claimed in claim 11, wherein the first user having the highest voice score is identified depending on whether the voice score of the first user is greater than or equal to a predetermined threshold value, and the second user having the highest fingerprint score is identified depending on whether the fingerprint score is greater than or equal to the predetermined threshold value.

13. The control method as claimed in claim 12, wherein the identifying of the access right comprises:
   identifying that a user has a first access right when the first user having the highest voice score and the second user having the highest fingerprint score are matched to each other, and
   identifying that a user has a second access right, which is lower than the first access right, when the first user having the highest voice score and the second user having the highest fingerprint score are not matched to each other.

14. The control method as claimed in claim 12, wherein when the first user having the highest voice score and the second user having the highest fingerprint score are different from each other, a user having higher recognition accuracy among the first user having the highest voice score and the second user having the highest fingerprint score is identified.

15. The control method as claimed in claim 12, further comprising obtaining a signal to noise ratio is obtained based on the obtained voice data, and adjusting the voice score of the first user is based on the obtained signal to noise ratio.

16. The control method as claimed in claim 10, further comprising:
   obtaining a control command by recognizing the obtained voice data; and
   determining whether the obtained control command is performed based on the obtained control command and the identified access right.

17. The control method as claimed in claim 16, further comprising:
   providing a user interface screen for additional authentication when the obtained control command is not performed by the identified access right; and
   changing the identified access right when the additional authentication is performed through the provided user interface screen.

18. The control method as claimed in claim 16, further comprising transmitting information about the identified access right to an external device, when the obtained control command is performed by the identified access right.

19. A non-transitory computer readable recording medium including a program for executing a control method of an electronic device, wherein the control method comprises:
   identifying a first user among a plurality of users by comparing voice data received through a communication interface with voice data for the plurality of users;
   identifying a second user among the plurality of users by comparing fingerprint data received through the communication interface with fingerprint data for the plurality of users; and
   differentially identifying an access right to the electronic device based on the first user and the second user.

* * * * *